United States Patent [19]

Gryder

[11] Patent Number: 5,193,721
[45] Date of Patent: Mar. 16, 1993

[54] PESTICIDE DISPENSER APPARATUS

[76] Inventor: Richard N. Gryder, 3735 Dawnwood, Woodland, Tex. 77380

[21] Appl. No.: 864,587

[22] Filed: Apr. 7, 1992

[51] Int. Cl.$^5$ .............................................. G01F 11/16
[52] U.S. Cl. .................................. 222/341; 222/509; 222/471; 43/124
[58] Field of Search .................. 43/124; 222/175, 185, 222/613, 511, 469–474, 509, 341; 111/7.1, 7.3

[56] References Cited

U.S. PATENT DOCUMENTS

| | | | |
|---|---|---|---|
| 1,110,182 | 9/1914 | Blandin et al. | 111/7.3 |
| 2,239,464 | 4/1941 | Moger | 222/175 X |
| 2,390,686 | 12/1945 | Bishop | 43/124 X |
| 2,580,755 | 1/1952 | Funk | 111/7.3 X |
| 2,746,655 | 5/1956 | Wolcott | 222/509 |
| 2,749,727 | 6/1956 | Fabro | 222/470 X |
| 2,800,865 | 7/1957 | Gathercoal | 111/7.1 |

FOREIGN PATENT DOCUMENTS

| | | | |
|---|---|---|---|
| 466770 | 5/1914 | France | 43/124 |
| 1558360 | 4/1990 | U.S.S.R. | 43/124 |

*Primary Examiner*—Mark Rosenbaum
*Assistant Examiner*—Frances Chin
*Attorney, Agent, or Firm*—Leon Gilden

[57] ABSTRACT

A dispenser apparatus includes a central housing, with the central housing mounting a supply container upper end thereof, wherein the supply container is arranged in varied orientation coaxially aligned with a delivery tube directed below the central housing. A trigger housing mounted to the central housing effects reciprocation of a control rod, with the control rod mounting a door plate within the central housing to permit communication between the container and the delivery tube. A modification of the invention includes end cap structure mounted to a lower distal end of the delivery tube to include a first cap formed with an apertured floor, and a second cap including a grinding mechanism to effect pulverizing of granular material for greater and more rapid absorption of pesticide components within a dispensed area.

7 Claims, 4 Drawing Sheets

PESTICIDE DISPENSER APPARATUS

BACKGROUND OF THE INVENTION

1. Field of the Invention

The field of invention relates to pesticide apparatus, and more particularly pertains to a new and improved pesticide dispenser apparatus wherein the same is directed to the selective dispensing of pesticide material within a desired area.

2. Description of the Prior Art

Pesticides of various types must be handled with care to avoid inherent health risks associated with their manipulation. In this regard, the instant invention attempts to overcome deficiencies of the prior art by providing ease of dispensing of components in an organization easily transported and manipulated during use. Prior art structure is set forth in the U.S. Pat. Nos. 3,494,333 and 4,202,472 setting forth insecticide dispenser bag structures.

U.S. Pat. Nos. 3,793,763 and 3,427,743 set forth insecticide bait dispenser structure of effective mobile and stationary construction relative to the two patents.

As such, it may be appreciated that there continues to be a need for a new and improved pesticide dispenser apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of pesticide dispenser apparatus now present in the prior art, the present invention provides a pesticide dispenser apparatus wherein the same is directed to the selective dispensing of pesticides or pesticide powder and granules. As such, the general purpose of the present invention, which will be described subsequently in greater detail, is to provide a new and improved pesticide dispenser apparatus which has all the advantages of the prior art pesticide dispenser apparatus and none of the disadvantages.

To attain this, the present invention provides a dispenser apparatus including a central housing, with the central housing mounting a supply container upper end thereof, wherein the supply container is arranged in varied orientation coaxially aligned with a delivery tube directed below the central housing. A trigger housing mounted to the central housing effects reciprocation of a control rod, with the control rod mounting a door plate within the central housing to permit communication between the container and the delivery tube. A modification of the invention includes end cap structure mounted to a lower distal end of the delivery tube to include a first cap formed with an apertured floor, and a second cap including a grinding mechanism to effect pulverizing of granular material for greater and more rapid absorption of pesticide components within a dispensed area.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pesticide dispenser apparatus which has all the advantages of the prior art pesticide dispenser apparatus and none of the disadvantages.

It is another object of the present invention to provide a new and improved pesticide dispenser apparatus which may be easily and efficiently manufactured and marketed.

It is a further object of the present invention to provide a new and improved pesticide dispenser apparatus which is of a durable and reliable construction.

An even further object of the present invention is to provide a new and improved pesticide dispenser apparatus which is susceptible of a low cost of manufacture with regard to both materials and labor, and which accordingly is then susceptible of low prices of sale to the consuming public, thereby making such pesticide dispenser apparatus economically available to the buying public.

Still yet another object of the present invention is to provide a new and improved pesticide dispenser apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
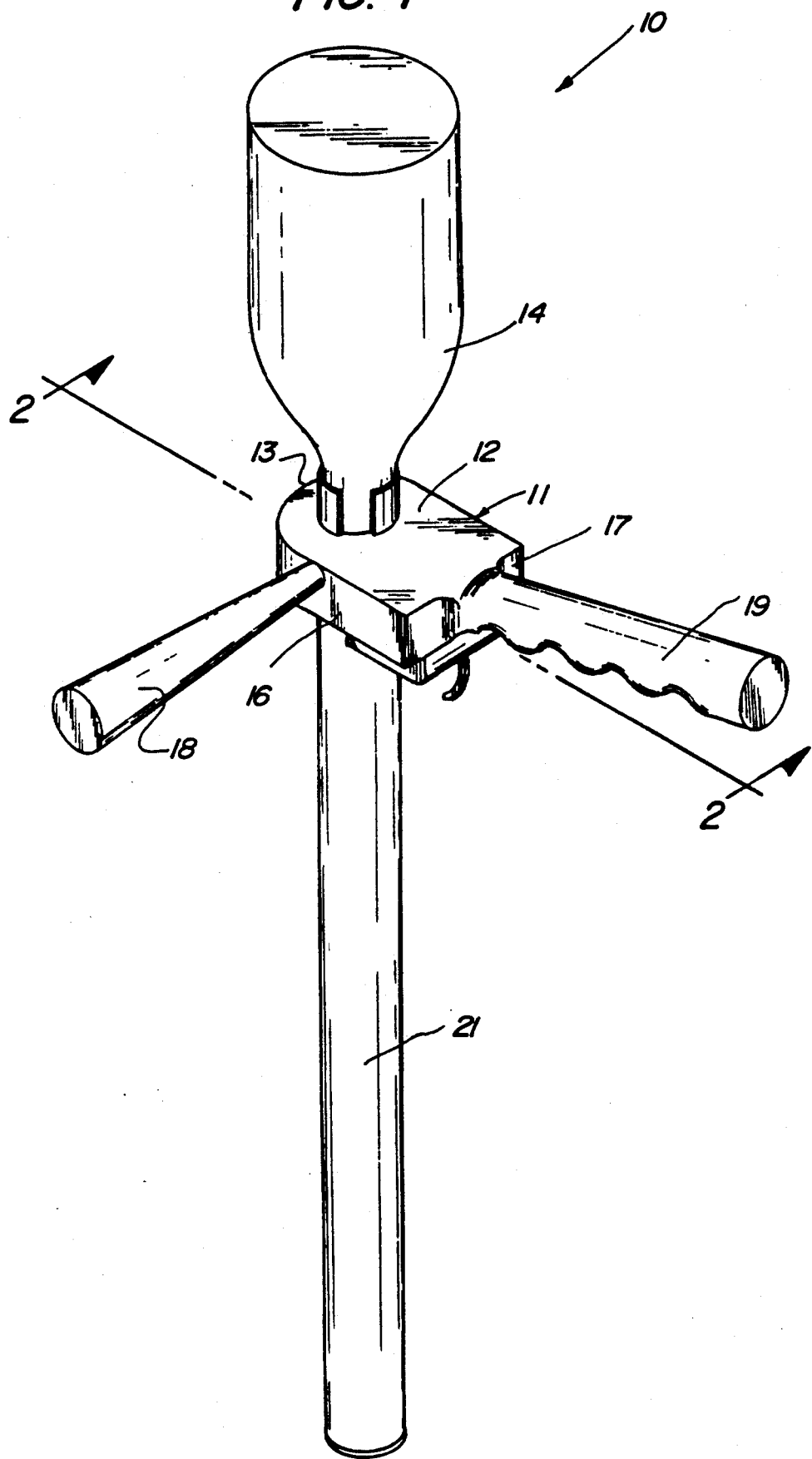
FIG. 1 is an isometric illustration of the instant invention.

With reference now to the drawings, and in particular to FIGS. 1 to 7 thereof, a new and improved pesticide dispenser apparatus embodying the principles and concepts of the present invention and generally designated by the reference numeral 10 will be described.

More specifically, the pesticide dispenser apparatus 10 of the instant invention essentially comprises a central housing 11, including a housing top wall 12, with a surrounding side wall, with the surrounding side wall defined by at least a first side wall 16 orthogonally oriented relative to the second side wall 17 mounting respective first and second handles 18 and 19 orthogonally oriented relative to one another. An inverted supply container 14 having its outlet at a lower distal end thereof is received within a split receiving tube 13 directed into the central housing 12 and coaxially aligned with an outlet tube 20 (see FIG. 2) for selective distribution of pesticide powder or granular components contained within the supply container 14. A delivery tube 21 having an upper distal end 22 includes a sealing ring 23 positioned within the tube adjacent the upper distal end for frictional securement to the delivery tube 21 below the central housing 11. The delivery tube 21 is arranged for reception of a respective first or second cap 40 and 44 (see the FIGS. 3 and 5 respectively) as further means of distribution of components from the supply container 14.

Figure 2:
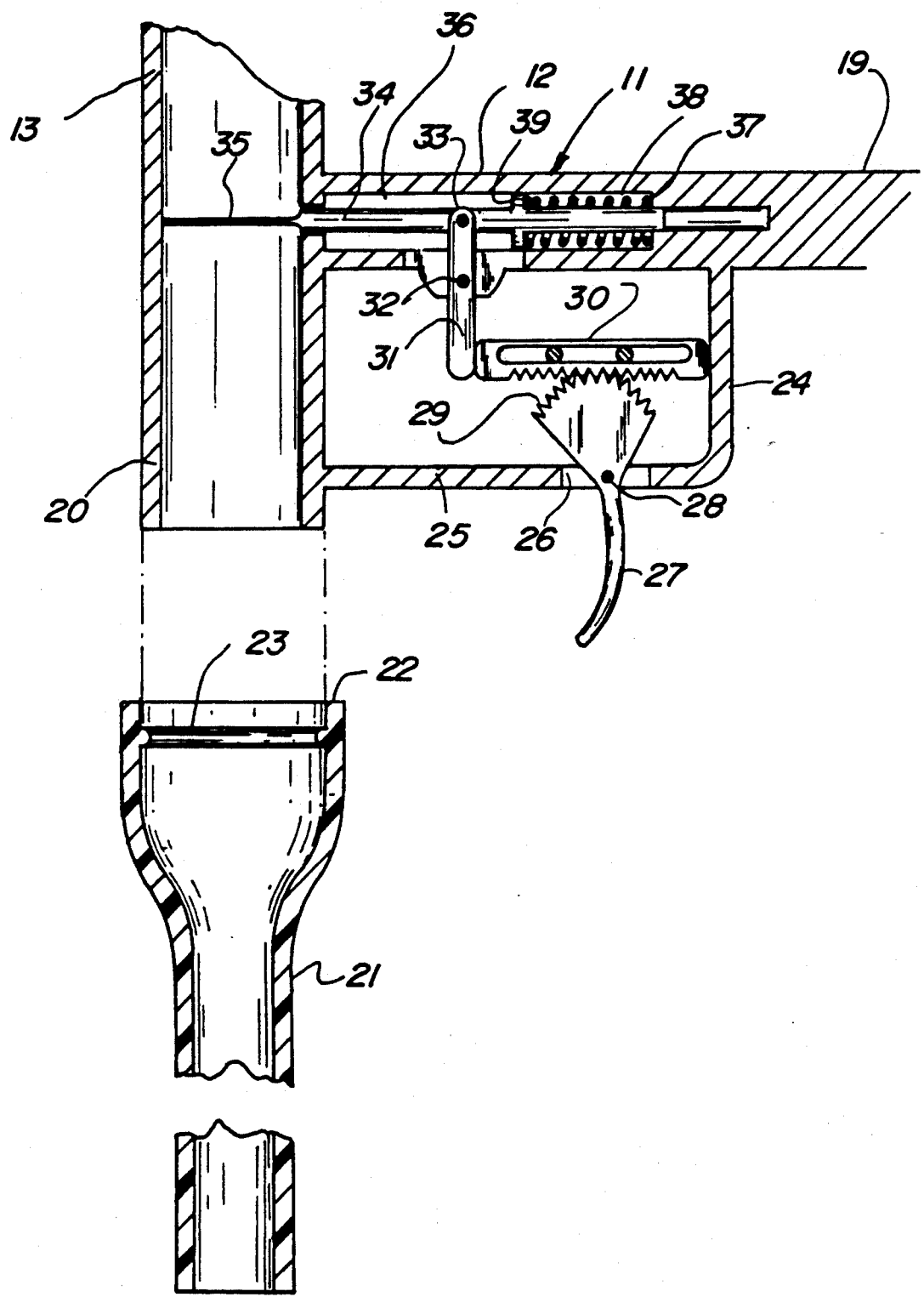
FIG. 2 is an orthographic view, taken along the lines 2—2 of FIG. 1 in the direction indicated by the arrows.
Figure 3:
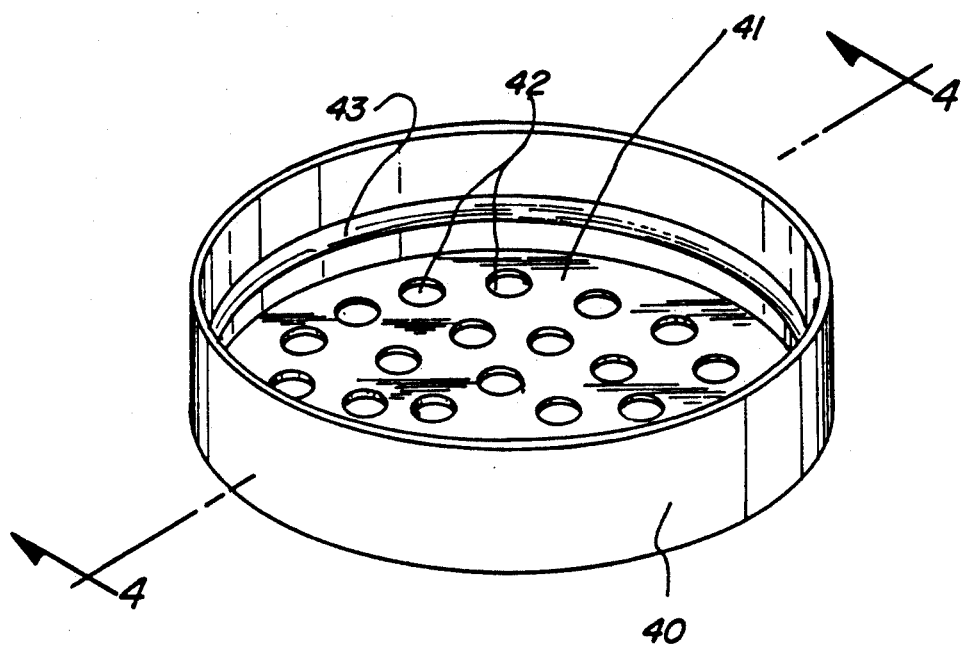
FIG. 3 is an isometric illustration of a first cap member utilized by the invention.
Figure 4:
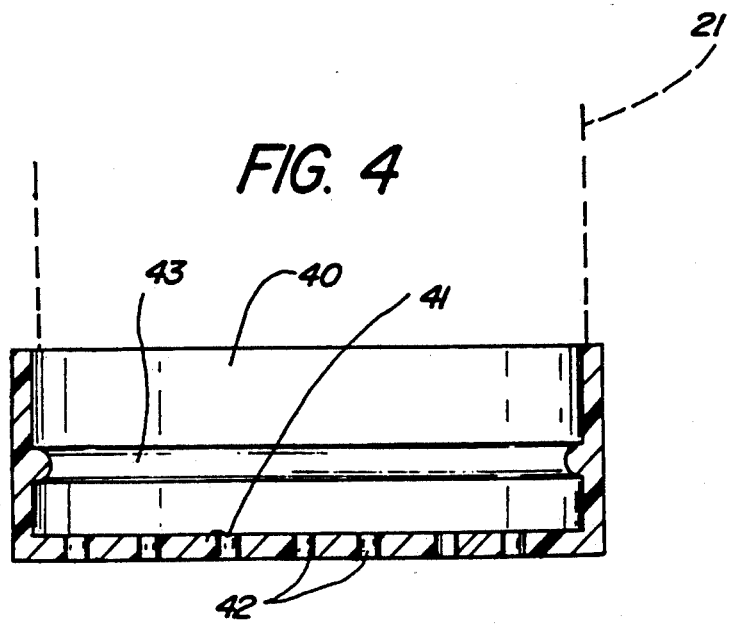
FIG. 4 is an orthographic view, taken along the lines 4—4 of FIG. 3 in the direction indicated by the arrows.

A trigger housing 24 is mounted below and to the central housing 11, including a trigger housing lower plate 25 formed with a lower plate slot 26. The trigger lever 27 is pivotally mounted within the slot 26 about a trigger lever axle 28 positioned within the lower plate 25. A trigger lever arcuate toothed upper periphery 29 is cooperative with a toothed linear rack 30 that is orthogonally oriented relative to the outlet and delivery tubes 20 and 21 relative to their axes and is slidably mounted within the trigger housing 24. A forward distal end of the linear rack 30 is arranged in abutment with the lower portion of an actuator lever 31 that includes an actuator lever first pivot axle 32 below an actuator lever second pivot axle 33. The second pivot axle 33 is mounted to a control rod 34 that is arranged parallel relative to the rack 30. A forward end of the control rod 34 mounts a door plate 35 that is slidably received at an interface between the receiving tube 13 and the outlet tube 20. The central housing includes a central housing rod bore 36 orthogonally oriented relative to the outlet tube 20, as well as a receiving tube 13, formed with a rod bore rear wall 37. The control rod 34 includes a control rod flange 39 to capture a control rod spring 38 between the central rod flange 39 and the rod bore rear wall 37 to bias the control rod 34 and the door plate 35 forwardly, with the door plate interposed within the outlet tube upper portion, as illustrated in FIG. 2, preventing flow of pesticide to the outlet tube 20 from the receiving tube 13. Upon pivotment of the trigger lever 27, the control rod 34 and the associated door plate 35 are retracted within the central housing permitting flow of pesticide.

The first distribution cap 40 incudes a first cap floor 41 formed with a matrix of apertures 42, with a distribution cap resilient mounting ring 43 of resilient construction mounted within the distribution cap for securement to the lower portion of the delivery tube 21.

Figure 5:
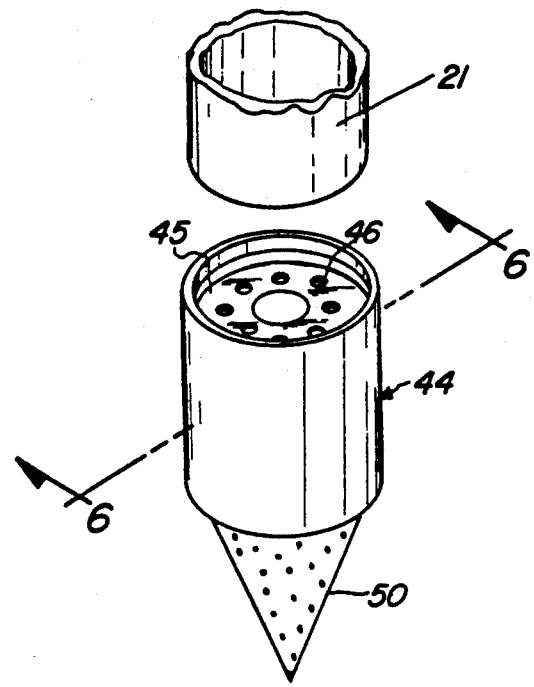
FIG. 5 is an isometric illustration of a second cap member utilized by the invention.
Figure 6:
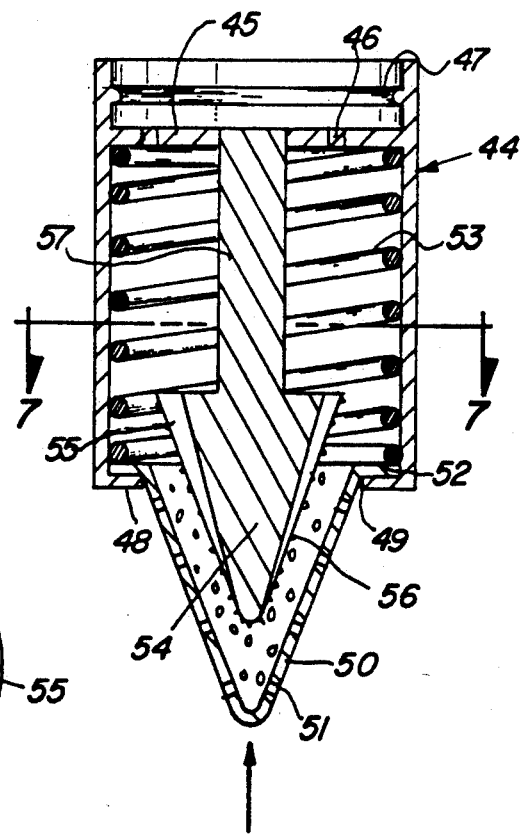
FIG. 6 is an orthographic view, taken along the lines 6—6 of FIG. 5 in the direction indicated by the arrows.
Figure 7:
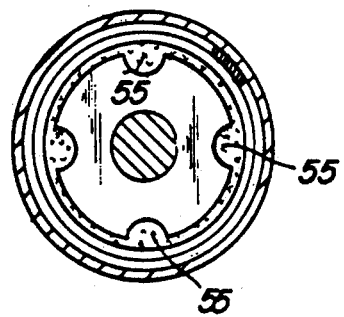
FIG. 7 is an orthographic view, taken along the lines 7—7 of FIG. 6 in the direction indicated by the arrows.

The second distribution cap 44 includes a second distribution cap upper floor 45 having a matrix of upper floor apertures 46 directed therethrough. A resilient mounting ring 47 is mounted within the cap above the upper floor 45 for securement to a lower portion of the delivery tube 21 having the delivery tube being received within the second distribution cap 44, in a manner as illustrated in FIG. 5. A lower floor 48 is spaced below and parallel the upper floor 45, with the lower floor 48 including a central bore 49 mounting a conical distribution head 50 therethrough, with the conical distribution head 50 including a matrix of distribution head apertures 51 directed therethrough. A distribution head annular flange 52 is mounted in surrounding relationship relative to an upper distal end of the distribution head 50 and is supported by the lower floor 48 to a top surface thereof. A spring 53 is arranged interposed upon the top surface of the annular flange 52 and to a bottom surface of the upper floor 45 to normally bias the conical distribution head 50 in contiguous communication with the lower floor 48. A conical grinding head 54 is coaxially aligned relative to the conical distribution head 50 positioned thereabove within the second distribution cap 44 mounted upon a support post 57 that in turn is medially and orthogonally mounted to a bottom surface of the upper floor 45. The conical grinding head 54 includes a plurality of spaced longitudinal grooves 55 directed from an upper end of the conical grinding head 54 therealong to a lower end of the grinding head 54. The grooves 55 permit ease of granular flow of material between the grinding head 54 and the distribution head 50. The grinding head's outer surface includes a matrix of projections 56 to enhance grinding of granular material captured between the grinding head and the distribution head, whereupon impacting of the distribution head 5 onto a surface effects simultaneous distribution of material through the apertures 51, as well as simultaneous grinding and pulverizing of granular material captured therebetween.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation show and described, and accordingly, all suitable modifications and equivalents may be resorted to, falling within the scope of the invention.

What is claimed as being new and desired to be protected by LETTERS PATENT of the United States is as follows:

1. A pesticide dispenser apparatus, comprising, a central housing, the central housing including a top wall, and a continuous side wall, wherein the continuous side wall includes a first side wall orthogonally oriented relative to a second side wall, the first side wall including a first handle, with the first handle orthogonally oriented relative to the second handle for ease of manipulation and alignment of the organization, the top wall including a receiving tube, the receiving tube directed into the central housing through the top wall, and an outlet tube directed into the central housing, wherein the supply container includes a bottom wall, with the outlet tube directed through the bottom wall into the central housing in coaxial alignment and in communication with the receiving tube, and a reciprocating door plate reciprocatably mounted relative to the central housing received at an interface between the receiving tube and the outlet tube, wherein the door is arranged for selective reciprocation permitting selective granular flow from the receiving tube to the outlet tube, and an inverted supply container positioned within the receiving tube, wherein the supply container includes an outlet opening at a lower distal end projected into the receiving tube, and the central housing includes a trigger housing mounted to the central housing bottom wall, wherein the trigger housing includes a lower plate spaced from the housing bottom wall, the lower plate including a plate slot, and a trigger lever pivotally mounted within the plate slot, and a lever axle directed into the lower plate pivotally mounting the trigger lever, and the trigger lever including an arcuate toothed upper periphery, and a toothed linear rack in engagement with the toothed upper periphery, with the toothed linear rack orthogonally oriented relative to the outlet tube slidably mounted within the trigger housing, and an actuator lever, the linear rack including a linear rack forward distal end arranged for abutment with the actuator lever, the actuator lever including an actuator lever first pivot axle pivotally mounting the actuator lever within the trigger housing, and the actuator lever including an actuator lever second pivot axle, and a control rod, with the actuator lever second pivot axle mounted to the control rod, and the control rod including the door plate mounted to a forward distal end of the control rod whereupon pivotment of the trigger lever effects reciprocation of the control rod and the door plate.

2. An apparatus as set forth in claim 1 wherein the central housing includes a central housing rod bore receiving the control rod, the rod bore including a rod bore rear wall, and the control rod including a control rod flange, and a control rod spring positioned between the control rod flange and the rod bore rear wall arranged to bias the door plate into the interface between the receiving tube and the outlet tube.

3. An apparatus as set forth in claim 2 including a delivery tube, the delivery tube including a delivery tube upper distal end arranged for mounting to the outlet tube in coaxial alignment therewith, and the delivery tube including a delivery tube lower distal end, the delivery tube lower distal end arranged for selective securement to a first distribution cap and a second distribution cap.

4. An apparatus as set forth in claim 3 wherein the first distribution cap includes a distribution cap floor, including a first cap matrix of apertures directed through the first distribution cap floor, and the first distribution cap including an annular skirt having a resilient mounting ring arranged therewithin for resilient engagement to the delivery tube.

5. An apparatus as set forth in claim 4 wherein the second distribution cap includes a second distribution cap tubular upper end having a further resilient mounting ring positioned within the second distribution cap tubular upper end for reception of the delivery tube therewithin, and the second distribution cap including a second distribution cap upper floor and a second distribution cap lower floor spaced below and parallel the second distribution cap upper floor, with the second distribution cap upper floor including a second distribution upper cap floor matrix of apertures directed therethrough, and the second distribution cap lower floor including a central bore directed therethrough, the central bore including an inverted conical distribution head projecting through the central bore, with the conical distribution head including an annular flange arranged in surrounding relationship relative to an upper distal end of the conical distribution head positioned upon a top surface of the lower floor, and the conical distribution head including a distribution head matrix of apertures directed therethrough, and a distribution head spring interposed between the distribution head annular flange and the lower floor to bias the distribution head in communication with the lower floor.

6. An apparatus as set forth in claim 5 including a support post mounted medially and coaxially of the second distribution cap upper floor projecting towards the second distribution cap lower floor and spaced thereabove, and a conical grinding head fixedly mounted in an inverted orientation to a lower distal end of the support post, with the conical grinding head spaced above and in coaxial alignment with the conical distribution head, whereupon rearward projection of the conical distribution head effects communication with the conical grinding head to permit grinding of granular material therebetween.

7. An apparatus as set forth in claim 6 wherein the conical grinding head includes a plurality of grooves longitudinally directed along an exterior surface of the conical grinding head, and the conical grinding head further including a grinding head outer surface, and the outer surface includes a matrix of projections for enhanced grinding of the granular material.

* * * * *